UNITED STATES PATENT OFFICE.

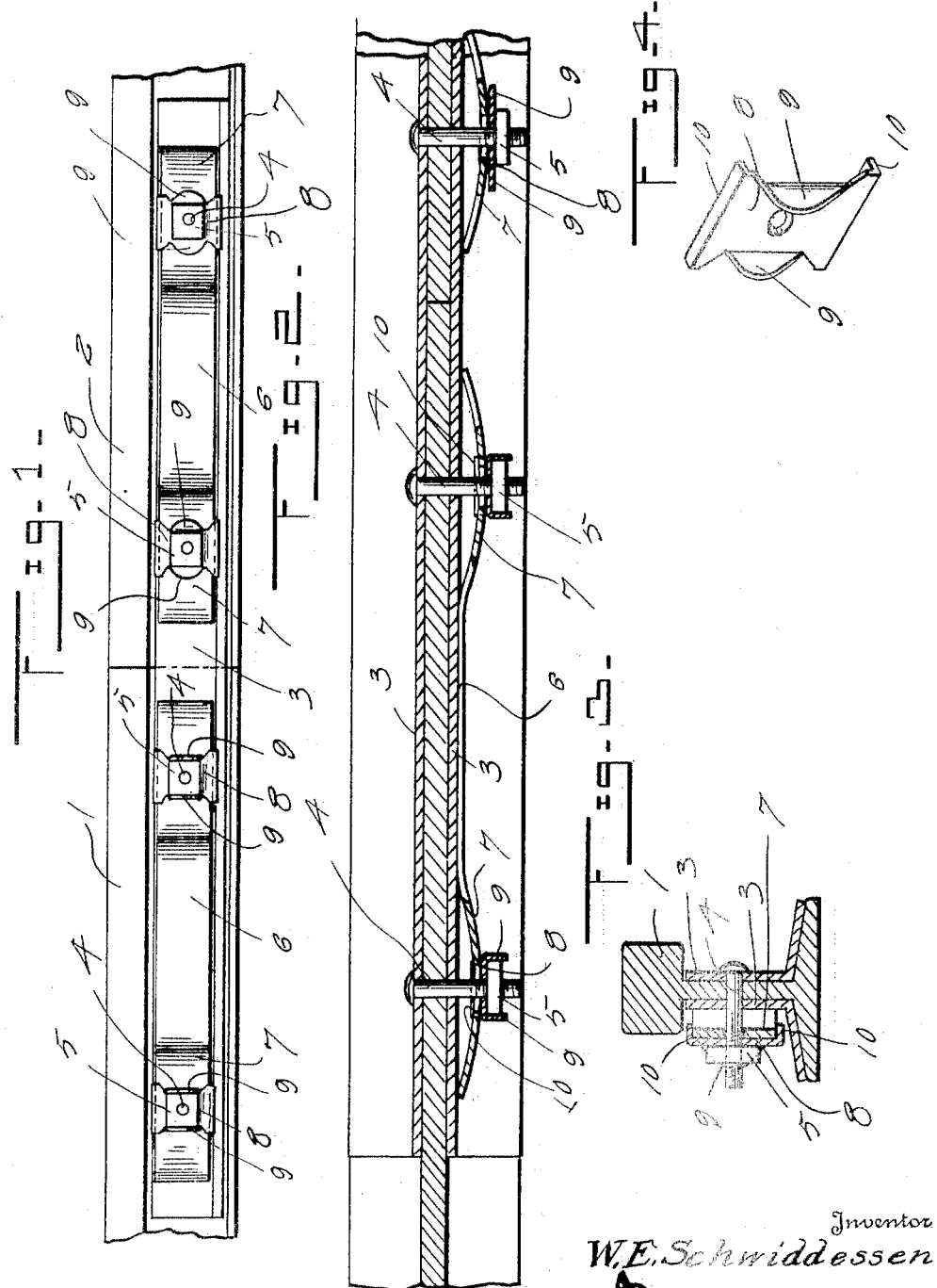

WILLIAM E. SCHWIDDESSEN, OF PERKINS COUNTY, SOUTH DAKOTA.

NUT-LOCK.

1,258,364.   Specification of Letters Patent.   Patented Mar. 5, 1918.

Application filed June 23, 1917. Serial No. 176,571.

*To all whom it may concern:*

Be it known that I, WILLIAM E. SCHWIDDESSEN, a citizen of the United States, residing in the county of Perkins and State of South Dakota, have invented certain new and useful Improvements in Nut-Locks; and I do hereby declare the following to be a full, clear, and exact description of the invention, such as will enable others skilled in the art to which it appertains to make and use the same.

This invention relates to improvements in a nut lock and has for one of its objects the provision of a device of this character, especially adapted for use on railroad rail joints for preventing the nuts on the bolts from becoming accidentally detached therefrom.

Another object of this invention is to provide a plate for each nut and which is apertured to receive the bolt and has formed on its side edges, flanges for engaging the nut to lock the plate to the nut.

A further object of this invention is the provision of a resilient bar or member on the bolts and adapted to be engaged by flanges formed on the upper and lower edges of the plates to prevent them from rotating with the nuts.

A still further object of this invention is the provision of a nut lock of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing in which:

Figure 1 is a side elevation of a nut lock constructed in accordance with my invention, Fig. 2 is a longitudinal sectional view of the same, Fig. 3 is a transverse sectional view illustrating the connection between the plates and the resilient bar or member, Fig. 4 is a detail perspective view of one of the plates.

Referring in detail to the drawing, the numeral 1 indicates one rail of a railroad rail joint, while the numeral 2 indicates the other rail, the rails being connected together by the ordinary fish plates 3, which have the bolts 4 for connecting them to the rails 1 and 2. The bolts 4 have the ordinary nuts 5 threaded thereon for preventing the bolts from becoming detached from the fish plates and rails.

It is usually customary to employ two bolts to each rail as shown in Fig. 1, and to prevent the nuts upon the bolts from becoming detached therefrom, I have provided a resilient bar or member 6 having each end bowed as at 7 and apertured to receive the bolt.

Each of the bolts 4 have mounted thereon, a plate 8, which plate is disposed between the bowed portions 7 of the bar or member 6 and the nuts 5. The plates 8 are constructed from sheet metal and have formed upon their side edges, flanges 9, which are adapted to be bent into engagement with the side faces of the nuts 5 as shown in Fig. 2 for locking the plates to the nuts. Rearwardly directed flanges 10 are formed upon the upper and lower edges of the plates 8 and adapted to engage the upper and lower edges of the bar or member 6 for locking the plates to said bar or member, and it will therefore be seen that the bowed portions of the bar or member 6 will always exert a pressure against the plates, which prevents the flanges 9 from disengaging the nuts and the plates will be held against rotation upon the bolts by the flanges 10 engaging the upper and lower edges of the bar or member 6.

The openings in the bulged portions of the bar or member are of elongated formation for permitting the bar or member to move upon the bolts, whereby a construction is provided which will permit the bar or member to exert pressure upon the plates and nuts at all times, thereby establishing a joint to railroad rails, which will take up or consume all wear of the various parts. The bar or member acts as an absorber or cushioning means to the device.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination, a rail joint including fish plates and bolts having nuts thereon, plates carried by said bolts, flanges connecting the plates to the nuts, a resilient member carried by the bolts, and means on the upper and lower edges of the plates for engagement with the upper and lower edges of said member.

2. In combination, a rail joint including fish plates and bolts having nuts thereon, plates carried by said bolts, means connecting the plates to the nuts, a member having each end bowed and apertured to receive the bolts, and flanges formed upon the plates and engaging the upper and lower edges of the member to lock the plates against rotation on the bolts.

In testimony whereof I affix my signature in presence of two witnesses.

WILLIAM E. SCHWIDDESSEN.

Witnesses:
JACOB FREY, Jr.,
BENJAMIN HARRISON FULLER.

Copies of this patent may be obtained for five cents each, by addressing the "Commissioner of Patents, Washington, D. C."